United States Patent
Mare et al.

(10) Patent No.: US 11,196,558 B1
(45) Date of Patent: Dec. 7, 2021

(54) SYSTEMS, METHODS, AND COMPUTER-READABLE MEDIA FOR PROTECTING CRYPTOGRAPHIC KEYS

(71) Applicant: TECHNOLOGY INNOVATION INSTITUTE, Masdar (AE)

(72) Inventors: Septimiu F. Mare, Timisoara (RO); Najwa Aaraj, Abu Dhabi (AE); Marcos Manzano, Abu Dhabi (AE); Alvaro Garcia, Abu Dhabi (AE)

(73) Assignee: TECHNOLOGY INNOVATION INSTITUTE, Masdar (AE)

( * ) Notice: Subject to any disclaimer, the term of this patent is extended or adjusted under 35 U.S.C. 154(b) by 0 days.

(21) Appl. No.: 17/196,341

(22) Filed: Mar. 9, 2021

(51) Int. Cl.
*H04L 9/08* (2006.01)

(52) U.S. Cl.
CPC ............ *H04L 9/0897* (2013.01); *H04L 9/085* (2013.01); *H04L 9/0819* (2013.01)

(58) Field of Classification Search
USPC ........ 380/286, 255, 264, 276; 726/2, 21, 36; 713/150, 163, 181
See application file for complete search history.

(56) References Cited

U.S. PATENT DOCUMENTS

| | | | | |
|---|---|---|---|---|
| 2006/0206793 | A1* | 9/2006 | Komamura | G06F 3/1222 715/205 |
| 2011/0138475 | A1* | 6/2011 | Gordon | H04L 9/085 726/26 |
| 2011/0271344 | A1* | 11/2011 | Unagami | G06F 21/554 726/23 |
| 2015/0142733 | A1* | 5/2015 | Shadmon | G06F 16/21 707/609 |
| 2015/0172412 | A1* | 6/2015 | Escriva | G06F 16/182 709/202 |
| 2018/0060037 | A1* | 3/2018 | Johnson | G06F 7/08 |
| 2019/0356650 | A1* | 11/2019 | Leavy | H04L 63/0815 |
| 2020/0081874 | A1* | 3/2020 | Annamalai | G06F 16/22 |
| 2020/0242156 | A1* | 7/2020 | Liu | G06F 16/81 |
| 2021/0194677 | A1* | 6/2021 | Pourzandi | H04L 9/0872 |

* cited by examiner

*Primary Examiner* — Sharif E Ullah
(74) *Attorney, Agent, or Firm* — Van Court & Aldridge LLP

(57) ABSTRACT

Systems, methods, and computer-readable media for protecting cryptographic keys are provided. Each cryptographic key is divided into multiple shares for storage at remote locations and for storage on a local device.

15 Claims, 4 Drawing Sheets

SYSTEMS, METHODS, AND COMPUTER-READABLE MEDIA FOR PROTECTING CRYPTOGRAPHIC KEYS

TECHNICAL FIELD

This can relate to systems, methods, and computer-readable media for protecting cryptographic keys.

BACKGROUND

Data breaches have become a regular and costly occurrence for companies and individuals who desire secure storage of their data. Data is often encrypted to prevent attackers from accessing the data. Cryptographic keys are used to encrypt and decrypt the data. Thus attackers focus their attacks on acquiring the cryptographic keys so that they can access the data. Accordingly, more effective techniques to protect cryptographic keys are needed.

SUMMARY

Systems, methods, and computer-readable media for protecting cryptographic keys are provided. Each cryptographic key is divided into multiple shares for storage at remote locations and for storage on a local device.

This Summary is provided to summarize some example embodiments, so as to provide a basic understanding of some aspects of the subject matter described in this document. Accordingly, it will be appreciated that the features described in this Summary are merely examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The above and other aspects of the disclosure, its nature, and various features will become more apparent upon consideration of the following detailed description, taken in conjunction with the accompanying drawings, in which like reference characters may refer to like parts throughout, and in which.

DETAILED DESCRIPTION

Figure 1:
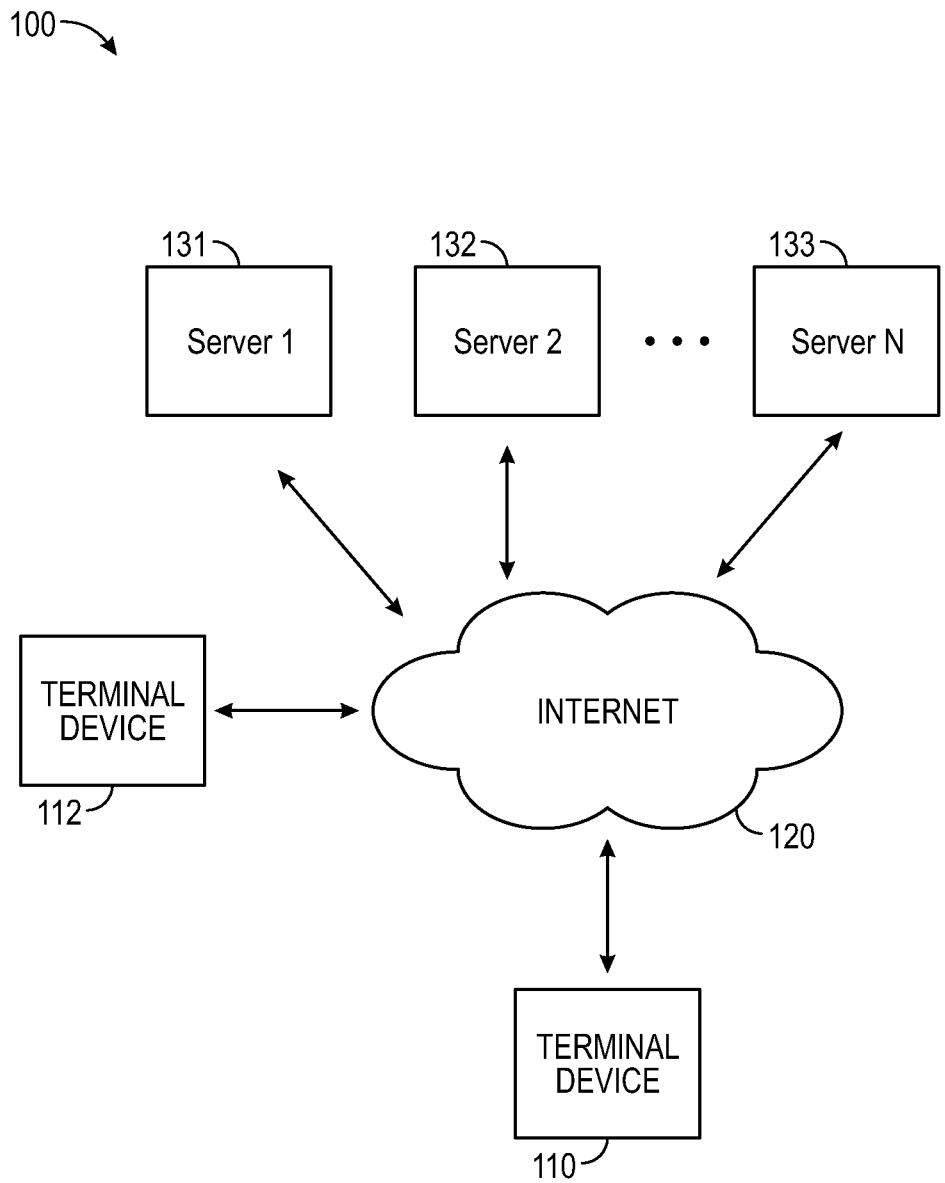
FIG. 1 shows a schematic diagram of an example system in accordance with an embodiment.

Systems, methods, and computer-readable media for protecting cryptographic keys are provided and described with reference to FIGS. 1-4. The keys are split into multiple shares and are distributed according to a key protection scheme discussed herein.

As defined herein, a communications stream refers to records that are generated during use of a communications system.

As defined herein, a cryptographic key is used to encrypt data. The cryptographic key is also used to decrypt the encrypted data to provide the data in its original un-encrypted form.

As defined herein, a page key is a plain text cryptographic key used to encrypt a data page.

As defined herein, a data page refers to a discrete quantity of data.

As defined herein, an encrypted page key is a page key that has been encrypted.

As defined herein, a remote distributed share or remote share is a portion of the encrypted page key that has been designated to be stored or is already stored on a remote server.

As defined herein, a locally held share or local share is a portion of the encrypted page key that has been stored locally on a terminal device.

As defined herein, a terminal device or server refers to an access point within a communications system that is being used by a user.

As defined herein, a remote sever or remote peer refers to equipment that stores remote shares that have been distributed by a key distribution scheme according to embodiments discussed herein.

Streamed data encryption, such as full-disk encryption, database encryption or memory page encryption, data is typically encrypted in blocks using symmetric keys due to desired performance properties. Encryption generally refers to the cryptographic process that either just encrypts or encrypts and protects against tampering. Many conventional systems generate cryptographic keys on a terminal device and store it therein. Some of these conventional systems use an external input (e.g., user's password) in combination with an encryption engine to generate cryptographic keys. Thus, whenever the user changes his password, the cryptographic keys require re-encryption. The security of this approach depends on the strength of the user password and that is only known to the user. However, user passwords are rarely of the same bit-length as an actual symmetric key used to encrypt. Hence, this is a primary reason why user passwords are not used directly as the cryptographic key, but rather as a key-encryption-key. The lower bit size of these user passwords implies that the easiest way to attack an encrypted block of data is to go after the user password because the rest of the information is in an encrypted format.

The evolution of secure enclaves and use of biometric sensors have enabled these passwords to be cached in the secure enclave's secure memory, locked by a fingerprint/iris/face ID. Utilizing biometric authentication can simplify the user experience seamless as it requires reduced password entries, however, this weakens the overall security of the system as the biometric sensors can be easily tricked into unlocking the user-known password, leading to a recovery of the symmetric key.

The advancements of cryptography and continuous evolution of security protocols and techniques, especially in end-to-end (E2E) encrypted systems, has forced attackers to devise more sophisticated attacks, especially when targeting the cryptographic components. Over the past 20 years attacks have shifted from a cryptographic point to a protocol vulnerability one to a targeted attack on the terminal device. With the evolution of hardware cryptographic coprocessors, secure enclaves or trusted execution environments, comes an added security benefit that more and more solution developers use out-of-the-box when designing secure communication systems. Most E2E secure communication systems are protected against man-in-the-middle (MiTM)

attacks, employing techniques such as certificate pinning, second-factor agreements and mutual public key whitelisting, or ephemeral cryptographic keys, to assure that the channel is secure. While this effectively protects the channel itself, attackers have shifted their focus towards the weakest link in this process, which is very often the terminal device itself.

Terminal devices can function as data processors that decapsulate encrypted information and store it locally. The information stored locally, whether encrypted or not is the main target of an attacker as it bypasses the need to compromise the channel and accesses the data at its source or destination. Mechanisms to secure the data at rest have not evolved at the same pace at which cryptographic methods and communication protocols have. That is, the communication records history is typically kept in an encrypted database (contiguous block) that is loaded and decrypted in memory by a given application. The database is the desired attack point in a targeted attack as it is the simplest one to mount. If the database is compromised, the attacker may have access to the entire communication history. Such attacks assumes the attacker can exfiltrate the key(s) from memory and capture the data either in transit or by remotely accessing the terminal device's communication history database. This database is what attackers target as it offers a plethora of weak points. For example, one weak point is the decryption key memory location as the database requires the key to reside in memory for the entire duration of reading/writing cycles. Another weak point is improper key management when discarding; keys are freed from memory in ways that is out of the developer's control. Database internals are rarely vetted from a security perspective, especially in open source solutions.

FIG. 1 shows a schematic diagram of an example system 100 in accordance with an embodiment. System 100 can include terminal device 110, terminal device 112, internet 120, and servers 131-133. A communications stream can exist between terminal device 110 and terminal device 112 or with any one or more of servers 131-133. The communications stream can include incoming and outgoing communications. For example, outgoing communications can originate with terminal device 110 and be transmitted to terminal device 112 or one or more of servers 131-133 and incoming communications can be transmitted from terminal device 112 or one of servers 131-133 and received by terminal device 110. For example, terminal device 110 can be a first smart phone that is engaged in a chat communication with a second smart phone (represented by device 112). In another example, terminal device 110 can be uploading pictures or video to cloud storage hosted by one of servers 131-133.

Terminal device 110 may represent a device that is being used by a user to access files or engage in a communications scheme. Servers 131-133 may represent devices that are located remote to terminal device 110 and can serve as communications endpoints with respect to terminal device 110 or storage locations for later retrieval. Internet 120 can represent any computer network that enables communications among devices 110 and 112 and servers 131-133. For example, the computer network can be a public network or a private network.

Embodiments disclosed herein create an intentional remote dependency on servers using a key protection scheme to provide shares of the encrypted key. Embodiments discussed herein include systems, methods, and computer readable media that protecting cryptographic keys by breaking the entire generation/key assembly process into a multi-factor (and multi-presence) one that creates an intentional dependency on (1) user input, (2) device secrets, and (3) server counterparts. Utilizing the three dependencies minimizes potential attack vectors, and provides control over denying access to cryptographic keys and the primitives on which the cryptographic keys are based. Embodiments discussed herein can be applied to any system or service, including streaming data where the data pages are encrypted and protected against unexpected modifications using cryptographic keys and stored on end terminals.

Figure 2:
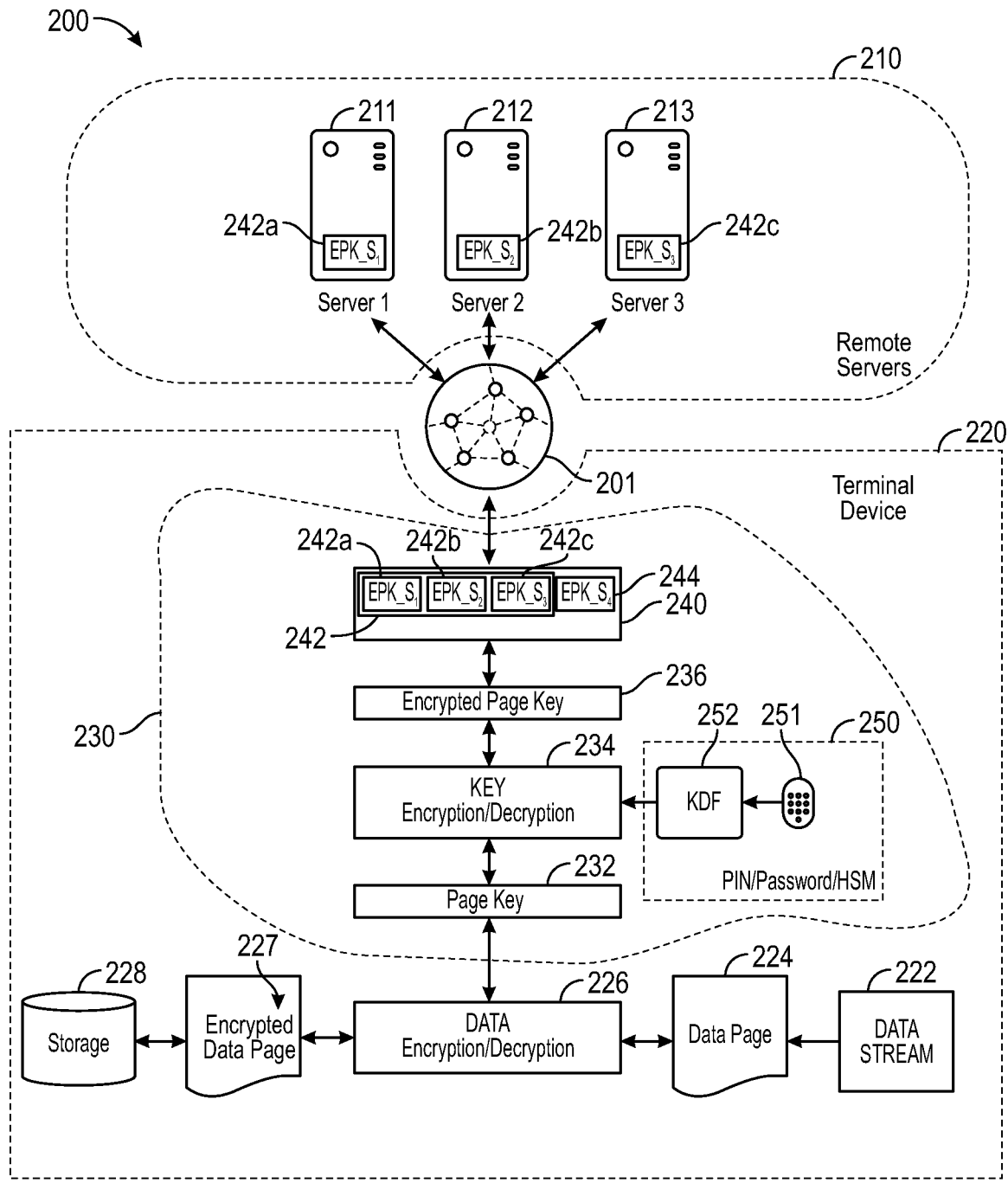
FIG. 2 shows an illustrative block diagram of the key distribution scheme being used according to an embodiment.

FIG. 2 shows an illustrative block diagram of the key distribution scheme being used within system 200 according to an embodiment. FIG. 2 is arranged to show that system 200 is split between remote servers 210 and terminal device 220. Terminal device 220 can communicate with any of servers 211-213 via network 201. During operation, data received from data stream 222 can be organized into a data page such as data page 224. Data stream 222 can be any suitable source of data such as, for example, chat messages, transcripts, emails, photos, videos, voice recordings, etc. that is generated or accessed by terminal device 220. Data stream 222 may contain data associated with a communications stream. Data received from data stream 222 can be aggregated into discrete chunks of data, referred to herein as a data page. Thus it should be appreciated that the data received from data stream 222 can be encapsulated into many different data pages. Only one such data page, data page 224, is shown in FIG. 2.

Each data page 224 is encrypted using data encryption/decryption block 226 to yield encrypted data page 227, which can be stored in storage 228. Encryption/decryption block 226 can encrypt data page 224 using page key 232. Page key 232 is a plaintext equivalent of a cryptographic key used for encryption/decryption operations. Each page key 232 is unique to each data page 224 and can be generated in a deterministic way (e.g., using key derivation functions). That is, for every data page that is encrypted, a unique encrypted key/page key is used.

The decryption routine follows the same path in an inverse direction. An encrypted data page 227 is retrieved from storage 228. The encrypted data page 227 is decrypted in block 226 using the appropriate page key associated with encrypted data page 227. This decryption yields data page 224.

Dashed line block 230 includes various components for implementing a key distribution scheme according to various embodiments. As shown, block 230 includes page key 232, key encryption/decryption block 234, encrypted page key 236, key splitting/reconstructing block 240, and second factor block 250. When page key 232 is no longer needed, for example, to encrypt a data page or to decrypt an encrypted data, page key 232 is encrypted via key encryption/decryption block 234 to yield encrypted page key 236. In addition, after page key 232 is encrypted (as encrypted page key 236), page key 232 is discarded from memory. Encrypted page key 236 is temporarily stored in memory so that key splitting block 240 can split encrypted page key 236 into several shares, some of which will be distributed for remote storage on servers 210 and held for local storage on terminal device 230. After block 240 has split encrypted page key 236 and the shares have been stored in the appropriate locations, encrypted page key 236 may be discarded.

Key encryption/decryption block 234 may receive an input from second factor block 250. The input received from second factor block may provide an additional layer of encryption/decryption protection that is used by block 234.

Second factor block 250 may require user input via terminal input 251 in which a user can enter a pin, password, or a secret key stored in a hardware security module (HSM). Key derivation function (KDF) block 252 can be used to prevent brute forcing terminal input 251 by adding lag between consecutive attempts before providing any second factor input key encryption/decryption block 234. The input provided by block 250 is considered an external input in the context of the key distribution scheme. The external inputs are treated as potential attack vectors (e.g., interception, brute forcing, or hacking of biometric systems to unlock cached encrypted page keys or page keys). Thus, for the reason block 250 represents a potential external threat, encrypted page key 236 or its unlocked counterpart page key 232 are only maintained in memory (or cache) when encrypting data page 224 or decrypting encrypted data page 227. Purging mechanisms discard both page key 232 and encrypted page key 236 in a cryptographically secure way when they are not needed.

Key splitting/reconstruction block 240 is operative to split encrypted key page 236 into a N shares, out of which K shares are required to reassemble encrypted key page 236. The shares can be classified as remote storage shares (shown as shares 242) and local storage share(s) (shown as share 244). Remote storage shares 242 are distributed via network 201 for storage on remote servers 210. For example, remote storage shares 242a-242c are stored on respective remote servers 211-213. Local storage shares 244 are stored on terminal device 230. After remote storage shares 242 are distributed to and stored on remote servers 210, remote storage shares 242 can be discarded, and the only share stored on terminal device 230 is local share 244.

The value N represents the pool of shares that are generated, and the subset value K is needed. An end user of the key distribution scheme can define the relationship of N shares, K shares, remote shares, and local shares. In a more secure setup K=N, and out of the K shares, A are kept local and K-A are designated as remote. If N>K, it is preferred that the number of remote shares (R) be designated as follows: R<K<N. These three parameters can be arranged in many different ways. In a first arrangement, K=N. This arrangement ensures that there is intentional server dependency and that here is no key recovery. In addition, in this arrangement, R<K=N.

In another arrangement, K=N. This arrangement ensures intentional server dependency and key recovery. In this setup R=K=N. This setup allows all K shares to be considered remote. Thus, if the user loses the terminal device the key can be fully reconstructed with servers by having K=R shares.

In yet another arrangement, K=N. This arrangement provides server dependency, but no key recovery. In this setup R<K<N, where the extra N-K key shares are designated as local shares. This approach is not recommended.

In yet another arrangement, K<N, which provides intentional server dependency and key recovery. In this setup, R>=K<N.

Splitting encrypted page key 236 into shares 242 (which are stored remotely) and share 244 (which is stored locally) prevent any server share combination from reassembling encrypted page key 236. This intentional dependency enables a user to be in control over the security of data in case of a compromise, confiscation, attack or suspected data breach attempt by using alternative channels to block the servers from providing missing shares to a potential attacker. That is, if a panic mode is activated (e.g., in response to an attack event) the remote servers 210 can be instructed to not provide any stored shares in response to a share fetch request. The panic mode may use a secondary communication channel between terminal device 230 and remote servers 210.

When a particular page key is needed, for example, to decrypt an encrypted data page, terminal device 230 can instruct key splitting/reconstruction block 240 to reconstruct the appropriate encrypted page key associated with that particular page key with remotely stored shares 242 fetched from remote servers 210 and local stored share 244 stored on terminal device 230. When all shares (both remotely stored and locally stored shares) are retrieved, block 240 can fully reconstruct encrypted page key 236. That encrypted page key 236 can be decrypted via key encryption/decryption block 234 to yield page key 232, which can be used to decrypt encrypted data page 227 in block 226.

Key splitting/reconstruction block 240 can be operative to store K−1 shares on remote servers 210, as discussed above, where one share is stored locally. As mentioned above, K is the number shares needed to reassemble an encrypted key page. It may be preferred that the number of shares stored on remote servers is always less than K. If desired, key splitting/reconstruction block 240 can store all K shares on remote servers 210, eliminating local storage of any share or shares. In another embodiment, key splitting/reconstruction block 240 can store K-A shares on remote server and store A shares locally (where A is less than K).

As also mentioned above, key splitting/reconstruction block 240 can split an encrypted page key into N shares. In some embodiments, N equals K. When N equals K, there may be no redundancy of remotely stored shares, requiring a separate sever to store only one share. Thus, during a fetch operation, all the servers will need to be accessed to fetch all remote stored shares. In another embodiment, N can be equal to X*K, where X is an integer of 2 or higher. In this approach, each remote server may store more than one remote stored share (e.g., 2 shares per server if X is 2), thereby reducing the number of remote servers to access during a fetch operation.

Figure 3:
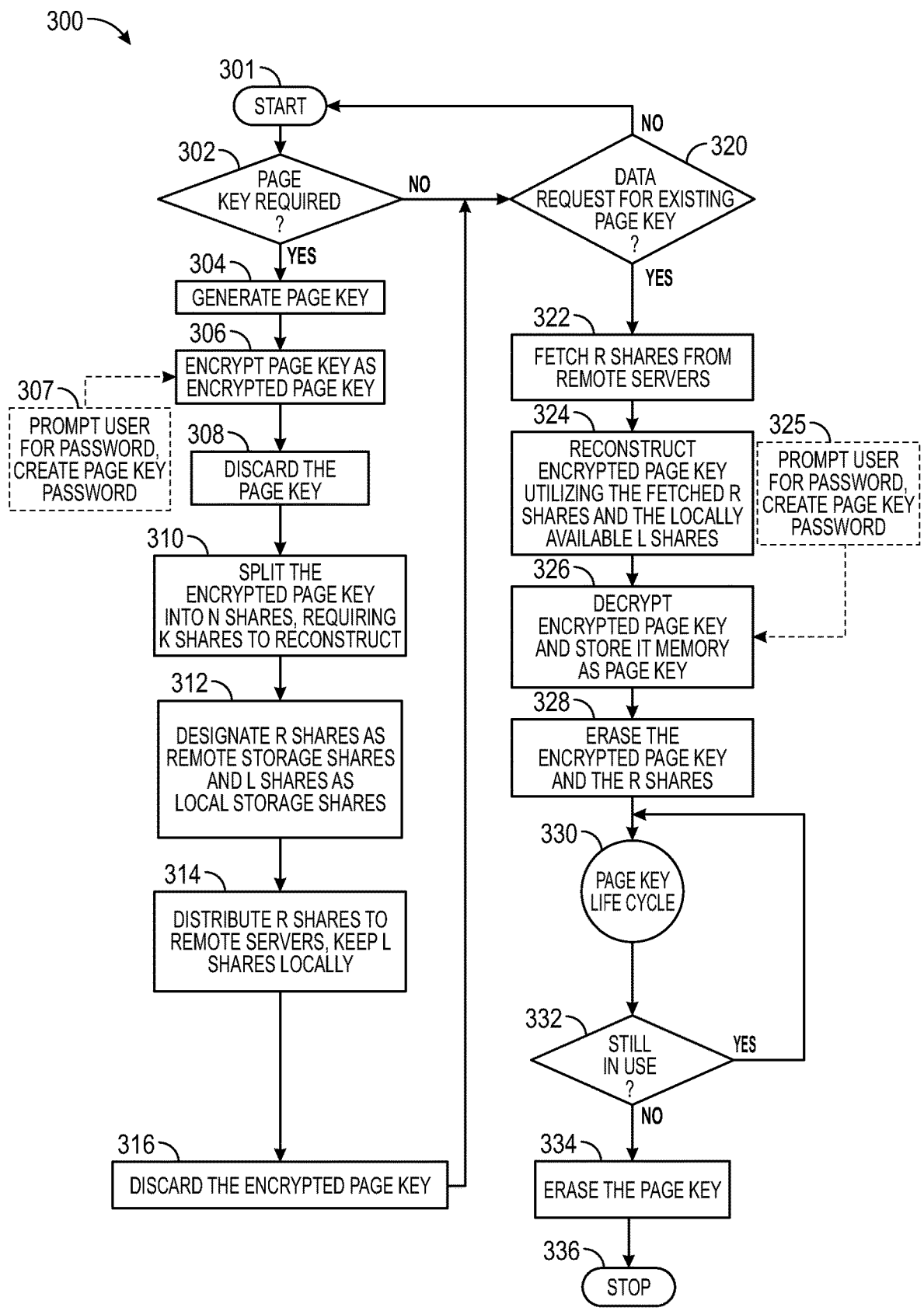
FIG. 3 shows an illustrative process according to an embodiment.

FIG. 3 shows illustrative process 300 according to an embodiment. Process 300 may be implemented in system 200, for example. Process 300 may begin start at step 301 determine whether a new page key is required at step 302. If the determination at step 302 is YES, process 300 may generate a page key (e.g., page key 232). This page key is a symmetric key used to encrypt a data page and to decrypt the encrypted version of that data page. The page key may be generated in a cryptographically secure manner. The page key may be randomly generated or deterministically generated. At step 306, the page key is encrypted to yield encrypted page key (e.g., encrypted page key 236). If desired, step 307 may prompt a user for a password, PIN, or challenge response that produces a secondary authentication (e.g., block 250) for protecting the page key. The second authentication can be used as an input to an encryption/decryption block (e.g., block 234) to encrypt the page key. The encrypted page key may be stored in memory of a terminal device. At step 308, the page key is discarded in a secure manner.

At step 310, the encrypted page key is split into N shares, requiring K shares to reconstruct the encrypted page key. Of the K shares, R shares are designated as remote storage shares and L shares are designated as locally stored shares such that R+L=K, as shown in step 312. At step 314, the R shares are distributed to remote servers (e.g., remote servers 210) and the L shares are stored locally on the terminal device (e.g., 230). By maintaining L shares on the terminal device, no combination of the R shares could enable a hacker to reassemble the encrypted page key. At step 316, the encrypted page key is discarded.

After step 316, or if a page key is not required at step 301, process 300 proceeds to step 320, which determines whether a data request is made for an existing age key. If the determination step 320 is NO, process 300 reverts back to start block 301. If the determination at step 320 is YES, process 300 can fetch the R shares from the remote servers, at step 322. In one embodiment, the fetched R shares may be associated only with the data pages being accessed or for which previously generated page keys are required to access the data pages. At step 324, the encrypted data page is reconstructed using the fetched R storage shares and the locally stored L shares. All K shares stemming from the R shares and L shares are retrieved as part of the reconstruction. The R shares can be shared in a redundant way among less than R servers, to reduce the number of total remote connections required by the terminal device to fetch all its missing shares. Having more than 1 server storing individual shares increases the security level of the system as in order to assemble all missing shares the terminal device needs to contact more servers, while having a more redundant approach raises the usability of the protocol.

Step 325 may prompt a user for a password, PIN, or challenge response that produces a secondary authentication (e.g., block 250) for unencrypting the encrypted page key at step 326. The unencrypted page key is stored in memory as a page key (in step 326). At step 328, the encrypted page key and the R shares are erased.

The page key is used for intended purposes in step 330. Process 300 can periodically check whether the page key is still needed in step 332. This check can be conditioned by a series of environment variables such as device state (locked/unlocked), application state (active/background), system events such as internet connectivity, airplane mode, interrupts, timeouts, power state, etc. This is to prevent lengthy retention of the sensible information in memory. The data can always be reconstructed under normal circumstances with the cost of losing negligible time due to the protocol involved. If the page key is determined to be no longer in use, the page key is erased at step 334 and process 300 can end at step 336.

It should be understood that the steps shown in FIG. 3 are merely illustrative that additional steps may be added, that the order of the steps may be rearranged, and that some steps may be omitted.

Figure 4:
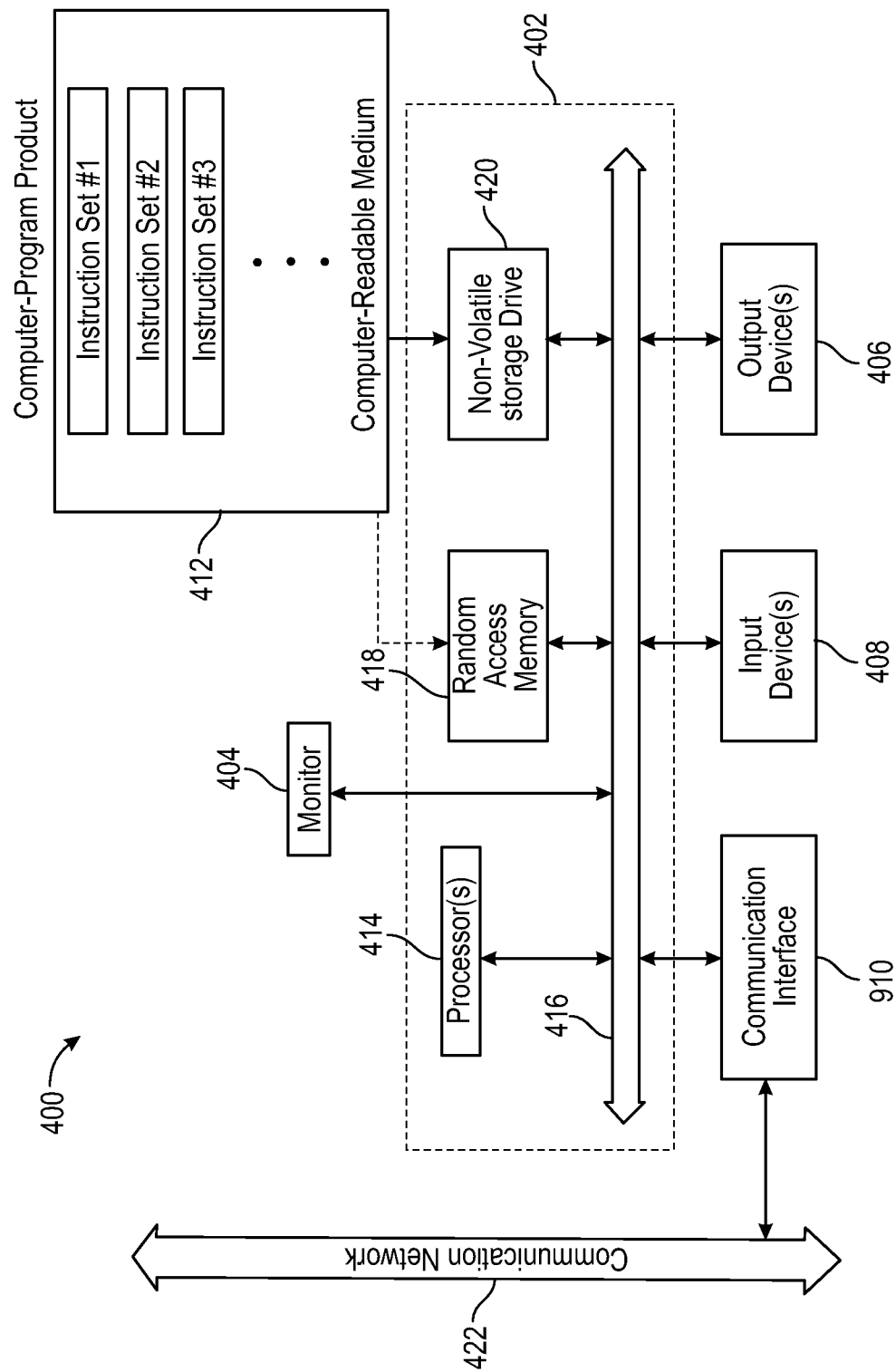
FIG. 4 is a block diagram of a special-purpose computer system according to an embodiment.

FIG. 4 is a block diagram of a special-purpose computer system 400 according to an embodiment. The methods and processes described herein may similarly be implemented by tangible, non-transitory computer readable storage mediums and/or computer-program products that direct a computer system to perform the actions of the methods and processes described herein. Each such computer-program product may comprise sets of instructions (e.g., codes) embodied on a computer-readable medium that directs the processor of a computer system to perform corresponding operations. The instructions may be configured to run in sequential order, or in parallel (such as under different processing threads), or in a combination thereof.

Special-purpose computer system 400 comprises a computer 402, a monitor 104 coupled to computer 402, one or more additional user output devices 406 (optional) coupled to computer 402, one or more user input devices 408 (e.g., keyboard, mouse, track ball, touch screen) coupled to computer 402, an optional communications interface 410 coupled to computer 402, and a computer-program product including a tangible computer-readable storage medium 412 in or accessible to computer 402. Instructions stored on computer-readable storage medium 412 may direct system 400 to perform the methods and processes described herein. Computer 402 may include one or more processors 414 that communicate with a number of peripheral devices via a bus subsystem 416. These peripheral devices may include user output device(s) 406, user input device(s) 408, communications interface 410, and a storage subsystem, such as random access memory (RAM) 418 and non-volatile storage drive 420 (e.g., disk drive, optical drive, solid state drive), which are forms of tangible computer-readable memory.

Computer-readable medium 412 may be loaded into random access memory 418, stored in non-volatile storage drive 420, or otherwise accessible to one or more components of computer 402. Each processor 414 may comprise a microprocessor, such as a microprocessor from Intel® or Advanced Micro Devices, Inc.®, or the like. To support computer-readable medium 412, the computer 402 runs an operating system that handles the communications between computer-readable medium 412 and the above-noted components, as well as the communications between the above-noted components in support of the computer-readable medium 412. Exemplary operating systems include Windows® or the like from Microsoft Corporation, Solaris® from Sun Microsystems, LINUX, UNIX, and the like. In many embodiments and as described herein, the computer-program product may be an apparatus (e.g., a hard drive including case, read/write head, etc., a computer disc including case, a memory card including connector, case, etc.) that includes a computer-readable medium (e.g., a disk, a memory chip, etc.). In other embodiments, a computer-program product may comprise the instruction sets, or code modules, themselves, and be embodied on a computer-readable medium.

User input devices 408 include all possible types of devices and mechanisms to input information to computer system 402. These may include a keyboard, a keypad, a mouse, a scanner, a digital drawing pad, a touch screen incorporated into the display, audio input devices such as voice recognition systems, microphones, and other types of input devices. In various embodiments, user input devices 408 are typically embodied as a computer mouse, a trackball, a track pad, a joystick, wireless remote, a drawing tablet, a voice command system. User input devices 408 typically allow a user to select objects, icons, text and the like that appear on the monitor 404 via a command such as a click of a button or the like. User output devices 406 include all possible types of devices and mechanisms to output information from computer 402. These may include a display (e.g., monitor 404), printers, non-visual displays such as audio output devices, etc.

Communications interface 410 provides an interface to other communication networks and devices and may serve as an interface to receive data from and transmit data to other systems, WANs and/or the Internet, via a wired or wireless communication network 422. Embodiments of communications interface 410 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 410 may be coupled to a computer network, to a FireWire® bus, or the like. In other embodiments, communications interface 410 may be physically integrated on the motherboard of computer 402, and/or may be a software program, or the like.

RAM 418 and non-volatile storage drive 420 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 418 and non-volatile storage drive 420 may be configured to store the basic programming and data constructs that provide the functionality of various embodiments of the present invention, as described above.

Software instruction sets that provide the functionality of the present invention may be stored in computer-readable medium 412, RAM 418, and/or non-volatile storage drive 420. These instruction sets or code may be executed by the processor(s) 414. Computer-readable medium 412, RAM 418, and/or non-volatile storage drive 420 may also provide a repository to store data and data structures used in accordance with the present invention. RAM 418 and non-volatile storage drive 420 may include a number of memories including a main random access memory (RAM) to store instructions and data during program execution and a read-only memory (ROM) in which fixed instructions are stored. RAM 418 and non-volatile storage drive 420 may include a file storage subsystem providing persistent (non-volatile) storage of program and/or data files. RAM 418 and non-volatile storage drive 420 may also include removable storage systems, such as removable flash memory.

Bus subsystem 416 provides a mechanism to allow the various components and subsystems of computer 402 communicate with each other as intended. Although bus subsystem 416 is shown schematically as a single bus, alternative embodiments of the bus subsystem may utilize multiple busses or communication paths within the computer 402.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing that contain or carry instruction(s) and/or data.

Whereas many alterations and modifications of the present invention will no doubt become apparent to a person of ordinary skill in the art after having read the foregoing description, it is to be understood that the particular embodiments shown and described by way of illustration are in no way intended to be considered limiting.

Moreover, the processes described with respect to one or more of FIGS. 1-4, as well as any other aspects of the disclosure, may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and optical data storage devices. In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from one electronic device to another electronic device using any suitable communications protocol. Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module of any one or more of any system, device, or server may be provided as a software construct, firmware construct, one or more hardware components, or a combination thereof, and may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules of any one or more of any system device, or server are merely illustrative, and that the number, configuration, functionality, and interconnection of existing modules may be modified or omitted, additional modules may be added, and the interconnection of certain modules may be altered.

While there have been described systems, methods, and computer-readable media for enabling efficient control of a media application at a media electronic device by a user electronic device, it is to be understood that many changes may be made therein without departing from the spirit and scope of the disclosure. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. A method implemented in a terminal device, comprising:
generating a page key for use in encrypting a data page;
encrypting the page key to provide an encrypted page key;
applying a key distribution scheme to the encrypted page key to generate a plurality of remote shares and at least one local share;
discarding the encrypted page key after the key distribution scheme has been applied to the encrypted key;
distributing the remote shares to a plurality of remote servers;
storing the at least one local share on the terminal device;
reconstructing the encrypted page key comprising:
fetching the remote shares from the plurality of remote servers;
retrieving the at least one local share from the terminal device; and
combining the fetched remote shares and the retrieved at least one local share to reconstruct the encrypted page key;
discarding the remote shares from the terminal device after the remote shares are distributed to the plurality of remote servers or after the encrypted page key has been reconstructed; and
instructing the plurality of remote servers not to provide any remote shares stored therein in response to an active panic mode.

2. The method of claim 1, wherein said applying the key distribution scheme comprises:
splitting the encrypted page key into N shares, wherein K shares are required to reconstruct the encrypted page key;
designating R shares as the plurality of remote shares; and
designating L shares as the at least one local share.

3. The method of claim 2, wherein when K is equal to N, R+L=N, and wherein when N>K, R<K<N.

4. The method of claim 1, further comprising discarding the page key after the page key has been encrypted to provide the encrypted page key.

5. The method of claim 1, further comprising encrypting the data page with the page key.

6. The method of claim 1, further comprising decrypting the encrypted page key to provide the page key after the encrypted page key has been reconstructed.

7. The method of claim 6, further decrypting an encrypted data page using the page key.

8. A computer-readable storage medium containing program instructions for a method being executed by an application, the application comprising code for one or more components that are called by the application during runtime, wherein execution of the program instructions by one or more processors of a computer system causes the one or more processors to perform steps comprising:
generating a page key for use in encrypting a data page;
encrypting the page key to provide an encrypted page key;
applying a key distribution scheme to the encrypted page key to generate a plurality of remote shares and at least one local share;
discarding the encrypted page key after the key distribution scheme has been applied to the encrypted key;
distributing the remote shares to a plurality of remote servers;
storing the at least one local share on the terminal device;
reconstructing the encrypted page key comprising:
fetching the remote shares from the plurality of remote servers;
retrieving the at least one local share from the terminal device; and
combining the fetched remote shares and the retrieved at least one local share to reconstruct the encrypted page key;
discarding the remote shares from the terminal device after the remote shares are distributed to the plurality of remote servers or after the encrypted page key has been reconstructed; and
instructing the plurality of remote servers not to provide any remote shares stored therein in response to an active panic mode.

9. The computer readable storage medium of claim 8, wherein said applying the key distribution scheme comprises:
splitting the encrypted page key into N shares, wherein K shares are required to reconstruct the encrypted page key;
designating R shares as the plurality of remote shares; and
designating L shares as the at least one local share.

10. The computer readable storage medium of claim 9, wherein K is equal to N or K is less than N.

11. The computer readable storage medium of claim 8, the method further comprising discarding the page key after the page key has been encrypted to provide the encrypted page key.

12. The computer readable storage medium of claim 8, the method further comprising encrypting the data page with the page key.

13. The computer readable storage medium of claim 8, the method comprising decrypting the encrypted page key to provide the page key after the encrypted page key has been reconstructed.

14. The computer readable storage medium of claim 13, the method further decrypting an encrypted data page using the page key.

15. A system comprising:
a terminal device operative to:
generate a page key for use in encrypting a data page;
encrypt the page key to provide an encrypted page key;
apply a key distribution scheme to the encrypted page key to generate a plurality of remote shares and at least one local share;
discard the encrypted page key after the key distribution scheme has been applied to the encrypted key;
distribute the remote shares to a plurality of remote servers;
store the at least one local share on the terminal device;
reconstruct the encrypted page key by fetching the remote shares from the plurality of remote servers, retrieving the at least one local share from the terminal device, and combining the fetched remote shares and the retrieved at least one local share to reconstruct the encrypted page key;
discard the remote shares from the terminal device after the remote shares are distributed to the plurality of remote servers or after the encrypted page key has been reconstructed; and
instruct the plurality of remote servers not to provide any remote shares stored therein in response to an active panic mode.

* * * * *